(12) United States Patent  (10) Patent No.: US 8,485,823 B2
Hirai                          (45) Date of Patent:      Jul. 16, 2013

(54) OBSTACLE DEVICE FOR VEHICLE DRIVING EXPERIENCE

(75) Inventor: Makoto Hirai, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 870 days.

(21) Appl. No.: 12/665,148

(22) PCT Filed: Jul. 8, 2008

(86) PCT No.: PCT/JP2008/062337
§ 371 (c)(1),
(2), (4) Date: Dec. 17, 2009

(87) PCT Pub. No.: WO2009/011250
PCT Pub. Date: Jan. 22, 2009

(65) Prior Publication Data
US 2010/0192464 A1    Aug. 5, 2010

(30) Foreign Application Priority Data

Jul. 17, 2007  (JP) ................................ 2007-186041
Jul. 17, 2007  (JP) ................................ 2007-186042

(51) Int. Cl.
*G09B 9/04* (2006.01)
(52) U.S. Cl.
USPC ........................................................ 434/68
(58) Field of Classification Search
USPC ........................................ 434/68, 66; 446/73
See application file for complete search history.

(56) References Cited

U.S. PATENT DOCUMENTS 2,263,299 A *  11/1941  Hanle ........................... 401/162
2,271,594 A *   2/1942  Kanalz ............................. 74/41
2,942,571 A *   6/1960  White ......................... 116/63 R
3,192,889 A *   7/1965  Crudgington ............... 116/63 R
4,551,722 A *  11/1985  Tsuda et al. ................... 340/904
5,467,548 A *  11/1995  Ross ............................... 40/612

(Continued)

FOREIGN PATENT DOCUMENTS

DE           9103575 U1      10/1991
JP           08-179684        7/1996

(Continued)

OTHER PUBLICATIONS

German Office Action application No. 110200800010870.7 dated Jul. 6, 2011.

*Primary Examiner* — Kurt Fernstrom
*Assistant Examiner* — Dolores Collins
(74) *Attorney, Agent, or Firm* — Squire Sanders (US) LLP

(57) ABSTRACT

An obstacle device for vehicle driving experience is provided which includes a support arm (3) disposed outside a path (P) of a vehicle (V), a support rod (4) supported on the support part (3) and capable of swinging back and forth along the path (P), and an obstacle (5) attached to a tip of the support rod (4) and positioned within the path (P) of the vehicle (V), swing control means (30) being provided between the support part (3) and the support rod (4), the swing control means (30) making resistance to a return swing of the support rod (4) from a forward swing position to a rear larger than resistance to swinging of the support rod (4) to a front due to collision of the vehicle (V) with the obstacle (5). Thus, during vehicle driving experience, even if the vehicle collides with the obstacle, it is possible to mitigate the collision impact effectively and to place the obstacle at a fixed position easily and quickly after the collision.

10 Claims, 13 Drawing Sheets

U.S. PATENT DOCUMENTS

| | | | |
|---|---|---|---|
| 5,485,758 A * | 1/1996 | Brown et al. | 73/865.8 |
| 5,574,426 A * | 11/1996 | Shisgal et al. | 340/435 |
| 5,650,765 A * | 7/1997 | Park | 340/436 |
| 5,764,134 A * | 6/1998 | Carr et al. | 340/384.1 |
| 5,927,986 A * | 7/1999 | Schottland | 434/68 |
| 6,114,950 A * | 9/2000 | Schaible et al. | 340/435 |
| 6,241,640 B1 * | 6/2001 | Chu | 482/83 |
| 7,739,087 B2 * | 6/2010 | Qiu | 703/8 |
| 7,811,089 B2 * | 10/2010 | Bond | 434/67 |
| 2005/0155441 A1 | 7/2005 | Nagata | |

FOREIGN PATENT DOCUMENTS

| | | |
|---|---|---|
| JP | 8-185114 | 7/1996 |
| JP | 07-081520 | 3/2005 |
| JP | 2005-202141 | 7/2005 |
| JP | 2007-038882 | 2/2007 |

* cited by examiner

# OBSTACLE DEVICE FOR VEHICLE DRIVING EXPERIENCE

TECHNICAL FIELD

The present invention relates to an obstacle device for vehicle driving experience that includes an obstacle disposed within a path of a vehicle, wherein in order to give experience of various types of functions of a vehicle such as an automobile the vehicle is made to travel toward the obstacle.

BACKGROUND ART

There is an automobile that is equipped with an obstacle handling system such as a collision mitigation brake system (ref. Patent Publication 1), which warns a driver by applying a tensioning force to a seat belt of a subject vehicle or automatically operating a brake when it detects a relative speed and distance with respect to an obstacle such as a vehicle preceding the subject vehicle while traveling and determines that the degree of obstruction exceeds a predetermined value, but it is very rare to actually experience the functions of the system on a normal road. However, for peace of mind and safe driving it is useful for a driver to experience the functions of the above-mentioned system.
Patent Publication 1: Japanese Patent No. 3046186

DISCLOSURE OF INVENTION

Problems to be Solved by the Invention

Conventionally, in order for a driver to experience the functions of the system, a plurality of blocks made of an impact absorbing material so that even if a vehicle collides therewith the vehicle is not damaged and a large impact is not given to the driver are stacked on a path of the vehicle as an obstacle in a safe place such as a test course, and the driver experiences the functions of the system by driving the vehicle equipped with the system toward the obstacle. In this case, it is preferable for the driver to carry out sudden braking and stop the vehicle in front of the obstacle when automatic braking for mitigating collision damage operates, but depending on the driver the vehicle often collides with the obstacle. In such a case, since it is necessary to immediately stack the plurality of blocks made of an impact absorbing material to assemble the obstacle and provide driving experience for the next driver, it takes time to carry out the assembly procedure and it is difficult to quickly provide many drivers with driving experience.

The present invention has been accomplished in the light of such circumstances, and it is an object thereof to provide an obstacle device for vehicle driving experience that, during vehicle driving experience, even if a vehicle collides with an obstacle, enables the collision impact to be mitigated effectively and enables the obstacle to be easily and quickly placed at a fixed position after the collision.

Means for Solving the Problems

In order to attain the above object, according to a first aspect of the present invention, there is provided an obstacle device for vehicle driving experience comprising a support part that is disposed outside a path of a vehicle, a support rod that is supported on the support part and is capable of swinging back and forth along the path, and an obstacle that is attached to a tip of the support rod and positioned within the path of the vehicle, wherein swing control means is provided between the support part and the support rod, the swing control means making resistance to a return swing of the support rod from a forward swing position to a rear larger than resistance to swinging of the support rod to a front due to collision of the vehicle with the obstacle.

The support part corresponds to a support arm in an embodiment of the present invention, which is described later.

According to a second aspect of the present invention, in addition to the first aspect, the support part is disposed above the path of the vehicle, the support rod is hung from the support part via the swing control means, and the obstacle is attached to a lower end part of the support rod.

According to a third aspect of the present invention, in addition to the first or second aspect, the swing control means is formed by disposing in series a one-way clutch and a damper between the support part and the support rod, the one-way clutch allowing the forward swing of the support rod but restraining the rearward swing, and the damper generating a damping force for at least the rearward swing of the support rod.

According to a fourth aspect of the present invention, in addition to the second or third aspect, a support post is standingly provided on a support platform placed outside the path of the vehicle, a support arm as the support part is connected to an upper end part of the support post, the support arm extending above the path of the vehicle, the support rod is detachably mounted on the tip of the support arm, and the support arm is arranged so that a state thereof can be changed between an extended state in which the support rod can be hung therefrom and a contracted state in which the support rod is stored on the support platform.

According to a fifth aspect of the present invention, in addition to the second aspect, the obstacle is formed from a mounting plate connected to the lower end of the support rod and an obstacle main body, made of an impact absorbing material, mounted on the mounting plate so as to cover the mounting plate, radio wave reflection means is mounted on the mounting plate, the radio wave reflection means being covered by the obstacle main body, and the radio wave reflection means is disposed so as to reflect radio waves, transmitted by a radar of an obstacle handling system provided on the vehicle, toward the radar side.

According to a sixth aspect of the present invention, in addition to the fifth aspect, the support rod is connected to the support part so that the support rod can also swing in a direction perpendicular to the path of the vehicle.

According to a seventh aspect of the present invention, in addition to the fifth aspect, a stable block is provided so as to be connected to the obstacle, the stable block being disposed so as to have friction against the road surface.

According to an eighth aspect of the present invention, in addition to the seventh aspect, the stable block is formed so as to be separable from the obstacle, and the obstacle and the stable block are connected via a connecting cord.

According to a ninth aspect of the present invention, in addition to any one of the fifth to eighth aspects, a target mark is displayed on a front face of the obstacle facing the vehicle on the path, the target mark having dimensions that can be recognized by a driver of the vehicle that is waiting at a distance and having a color that stands out from the surroundings.

According to a tenth aspect of the present invention, in addition to the fifth aspect, a support post is standingly provided on a support platform placed outside the path of the vehicle, a support arm as the support part is connected to an upper end part of the support post, the support arm extending above the path of the vehicle, the support rod is detachably mounted on the tip of the support arm, and the support arm is arranged so that a state thereof can be changed between an extended state in which the support rod can be hung therefrom and a contracted state in which the support rod is stored on the support platform.

Effects of the Invention

In accordance with the first aspect of the present invention, when experiencing driving of a vehicle, even if the vehicle traveling on the path collides with the obstacle, since there is hardly any resistance from the swing control means to forward swinging of the support rod, the obstacle smoothly swings forward of the vehicle together with the support rod due to the impact force, and the impact force on the vehicle and the obstacle can be mitigated effectively. After the collision, the obstacle and the support rod attempt to make a return swing, but since the swing control means exhibits a comparatively large resistance to this return swing, the support rod either stops at the forward swing position or makes a gentle return swing, and it is possible to avoid an impact on the driver, the vehicle, and the obstacle due to the return swing.

After the collision, by pivoting the support rod so that the obstacle goes to a predetermined position on the path of the vehicle, it is immediately ready for experiencing driving for the next vehicle.

In accordance with the second aspect of the present invention, the support rod and the obstacle swing within the path, and they do not interfere with operations of an operator supervising outside the path.

In accordance with the third aspect of the present invention, when the support rod swings forward of the vehicle, the one-way clutch controls the forward swing smoothly, and when it swings rearward, the damper attenuates the rearward swing; it is therefore possible to reliably exhibit a desired function of the swing control means by the one-way clutch and the damper.

In accordance with the fourth aspect of the present invention, after the obstacle device for vehicle driving experience is used, the device can be arranged compactly on the support platform, and it is therefore possible to easily carry out moving and storage of the device.

In accordance with the fifth aspect of the present invention, when the driver drives the vehicle equipped with the obstacle handling system toward the obstacle, the obstacle handling system of the vehicle computes a relative speed and distance of the subject vehicle with respect to the obstacle from the conditions of transmission and reception of radio waves between the radar and the radio wave reflection means, and when it determines that the degree of obstruction exceeds a predetermined value, it warns the driver by applying a tensioning force to a seat belt of the subject vehicle or automatically operating a brake. Since the driver makes the vehicle approach the obstacle in this way, the driver can with certainty experience the functions of the obstacle handling system provided on the vehicle. Furthermore, the obstacle hanging down from above can be formed with a relatively small size that is sufficient to include the radio wave reflection means; if it is small the fear given to the driver will also be small, and it is possible to carry out a practice in which an emergency braking operation is carried out after the vehicle has been brought as close to the obstacle as possible.

Even when the driver makes the vehicle collide with the obstacle, the obstacle swings a long way forward of the vehicle together with the support arm while absorbing the impact force from the vehicle in the obstacle main body, which is made of an impact absorbing material, and it is thereby possible to effectively mitigate the impact force on the vehicle, its driver, the obstacle, the radio wave reflection means, etc.

Furthermore, in accordance with the sixth aspect of the present invention, when the vehicle collides obliquely with the obstacle and an impact component force in the lateral direction acts on the obstacle, the support rod swings without resistance in the lateral direction of the path to thus allow the impact component force to escape, and it is possible to suppress the imposition of a bending load on the support rod.

In accordance with the seventh aspect of the present invention, since the stable block placed in frictional contact with road surface is provided so as to be connected to the obstacle, it is possible by frictional resistance between the stable block and the road surface to prevent the obstacle and the support rod from swaying due to wind, and it is therefore possible to stably maintain the position of the obstacle, which is a driving target for the driver.

In accordance with the eighth aspect of the present invention, since the stable block is connected to the obstacle via the connecting cord, regardless of the height adjustment of the obstacle the stable block can always be put in frictional contact with the road surface, thereby preventing the obstacle from swaying. Moreover, this stable block is restrained from moving far away from the obstacle by the connecting cord even when the vehicle collides with the obstacle, and resetting of the stable block can easily be carried out.

In accordance with the ninth aspect of the present invention, since a target mark that has dimensions that can be recognized by the driver of the vehicle waiting at a distance and has a color that stands out from the surroundings is displayed on the front face of the obstacle, it becomes easy for the driver to see the obstacle by means of the target mark, and it is possible to drive the vehicle accurately toward the obstacle without being misled by the surrounding landscape.

In accordance with the tenth aspect of the present invention, after the obstacle device for vehicle driving experience is used, the device can be arranged compactly on the support platform, and it is therefore possible to easily carry out moving and storage of the device.

Figure 1:
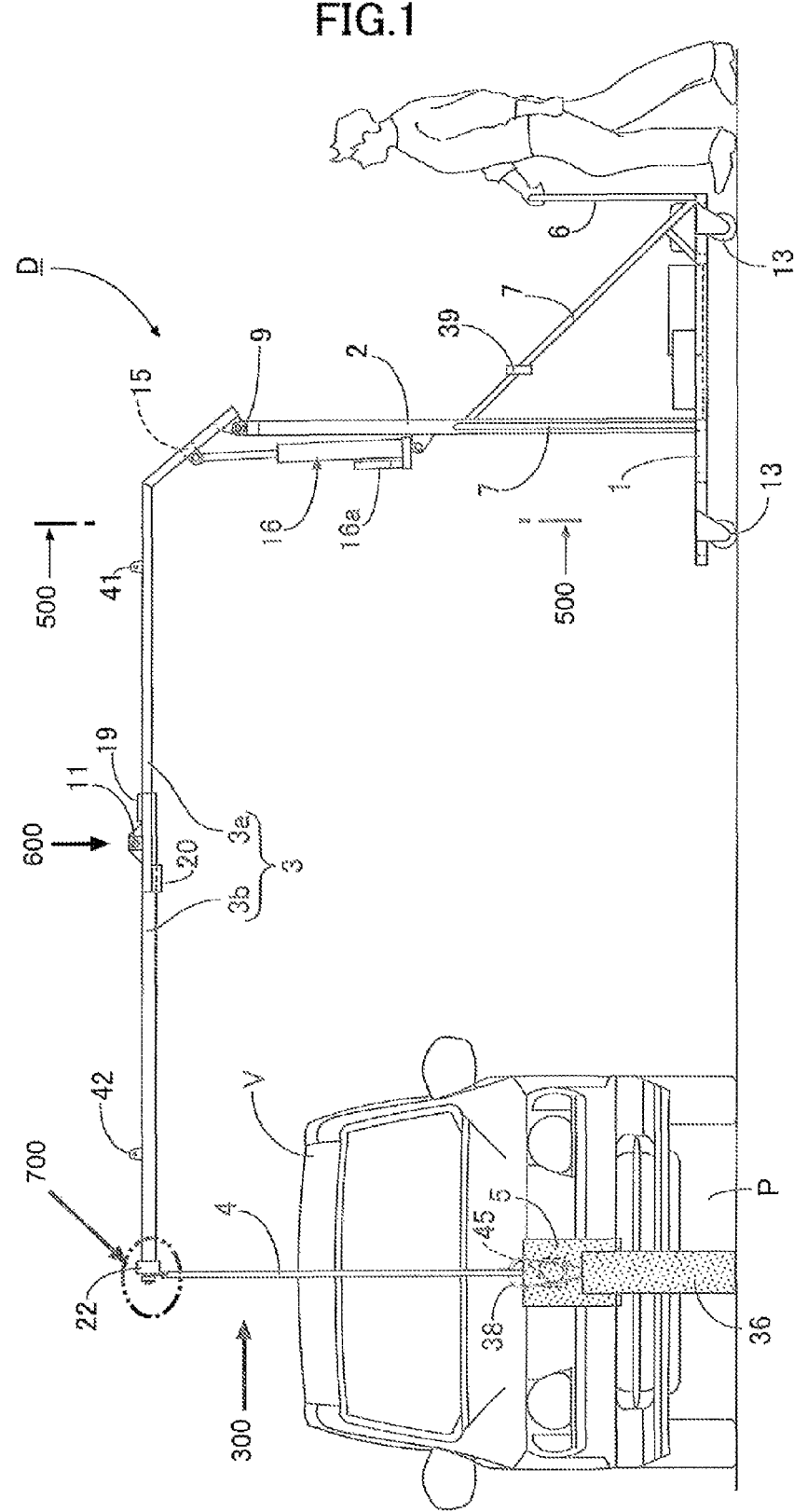
FIG. 1 is a side view of an obstacle device for vehicle driving experience, related to an embodiment of the present invention, in use.

EXPLANATION OF REFERENCE NUMERALS
AND SYMBOLS

D Obstacle device for vehicle driving experience
P Path
V Vehicle
1 Support platform
2 Support post
3 Support part (support arm)
4 Support rod
5 Obstacle
28 One-way clutch
29 Damper (hydraulic damper)
129 Damper (friction damper)
30 Swing control means
34 Radio wave reflection means
35 Target mark
36 Stable block
38 Connecting cord
45 Radar

BEST MODE FOR CARRYING OUT THE
INVENTION

Preferred embodiments of the present invention are explained below by reference to the attached drawings.

Figure 3:
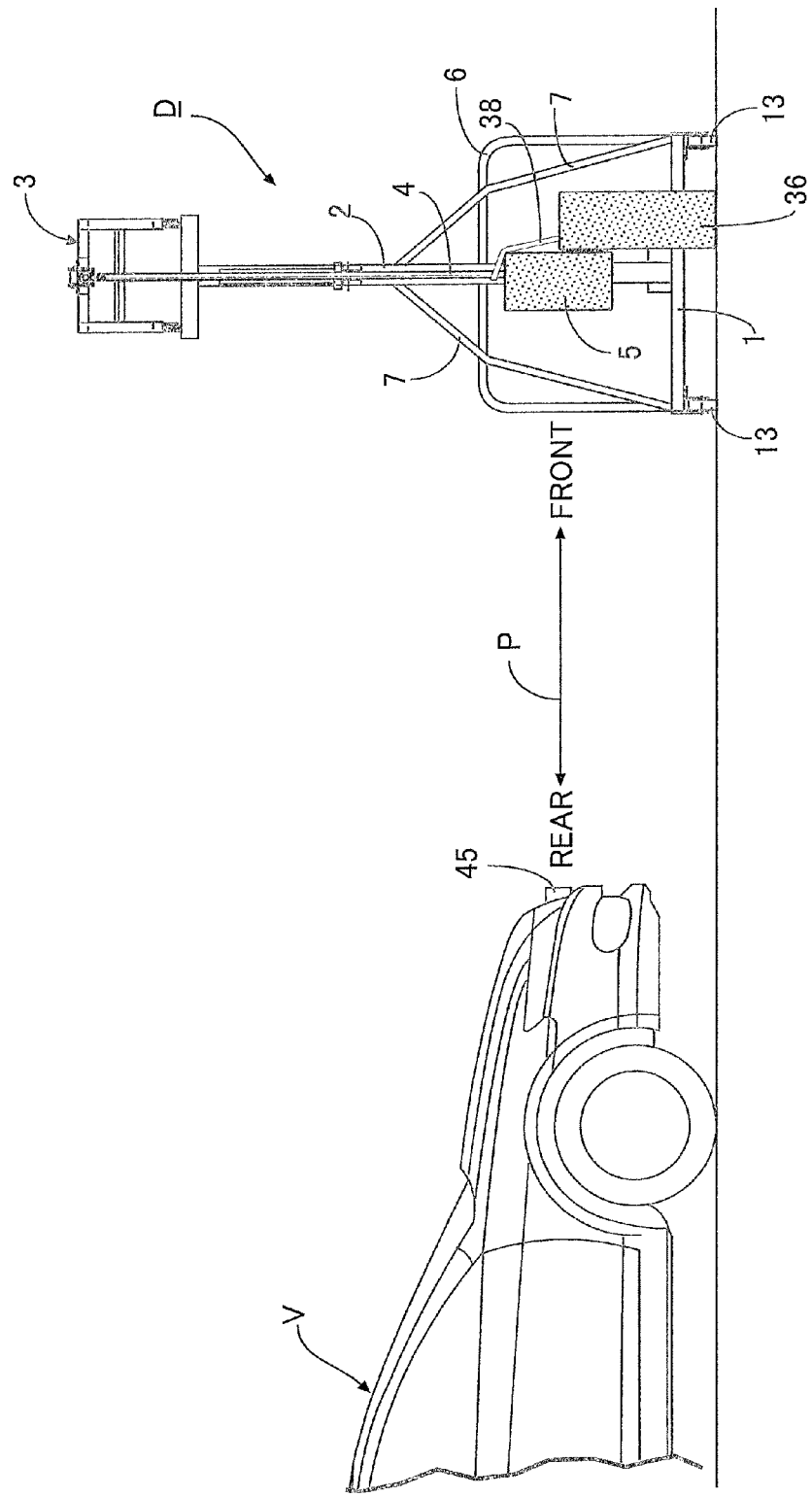
FIG. 3 is a view from arrow 300 in FIG. 1.

First, in FIG. 1, a vehicle V is equipped with the above-mentioned known obstacle handling system, and a radar 45 (see also FIG. 3) of the system is mounted on a front end face of the vehicle V. An obstacle device D for vehicle driving experience of the present invention is disposed at a position sufficiently distant from the vehicle V to the front on a path P of the vehicle V.

The obstacle device D for vehicle driving experience of the present invention includes a support platform 1 disposed outside the path P of the vehicle V, a support post 2 standingly provided on the support platform 1, a support arm 3 connected to an upper end part of the support post 2 and extending above the path P of the vehicle V, a support rod 4 that is hung from a tip of the support arm 3 and is capable of swinging back and forth along the path P, and an obstacle 5 attached to a lower end part of the support rod 4 and disposed within the path P.

In FIG. 1 to FIG. 4, the support platform 1 has a rectangular shape in plan view, a brake-equipped caster 13 is provided at four corners thereof, and a handle 6 for pushing by hand is fixedly provided on a rear part thereof on the side opposite to the path P of the vehicle V, the support platform 1 being capable of being moved by human power. A plurality of stays 7 for reinforcing the support post 2 are obliquely connected between the support platform 1 and the support post 2.

Figure 4:
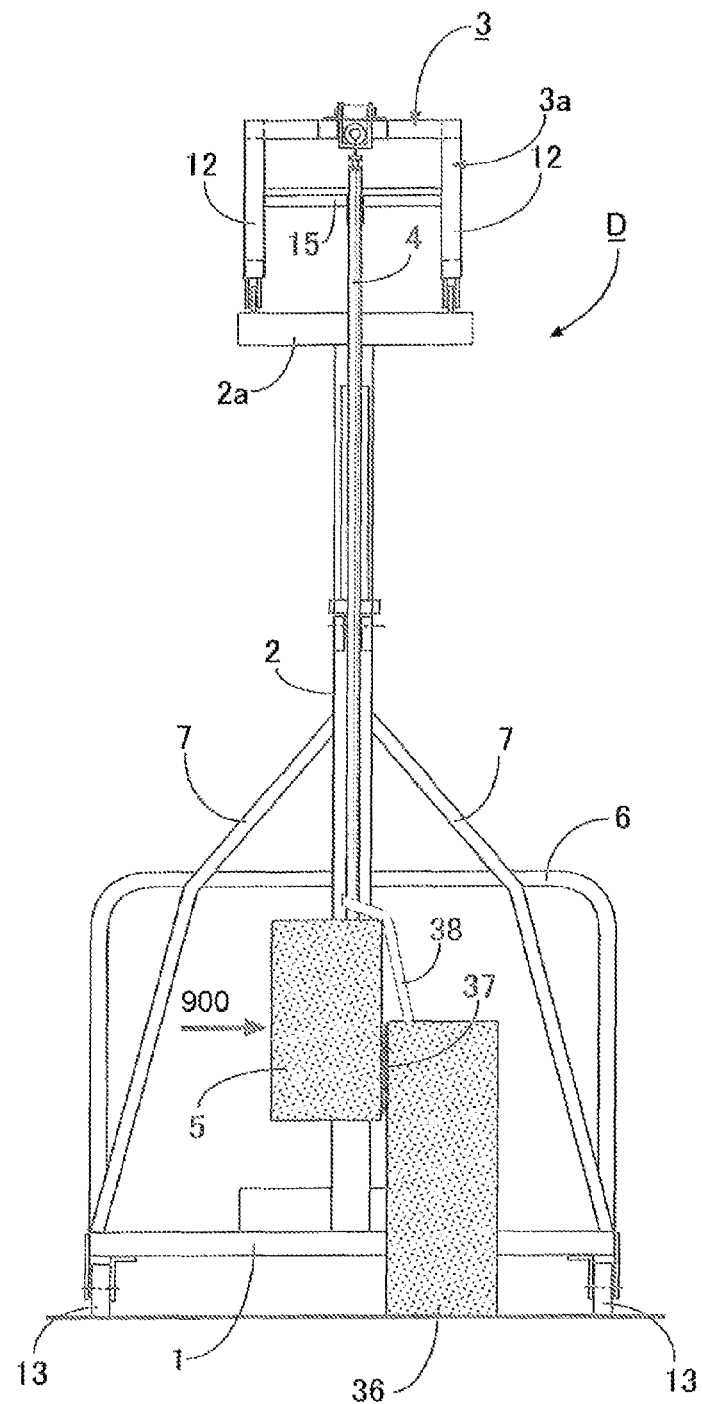
FIG. 4 is an enlarged view of an essential part of FIG. 3.
Figure 5:
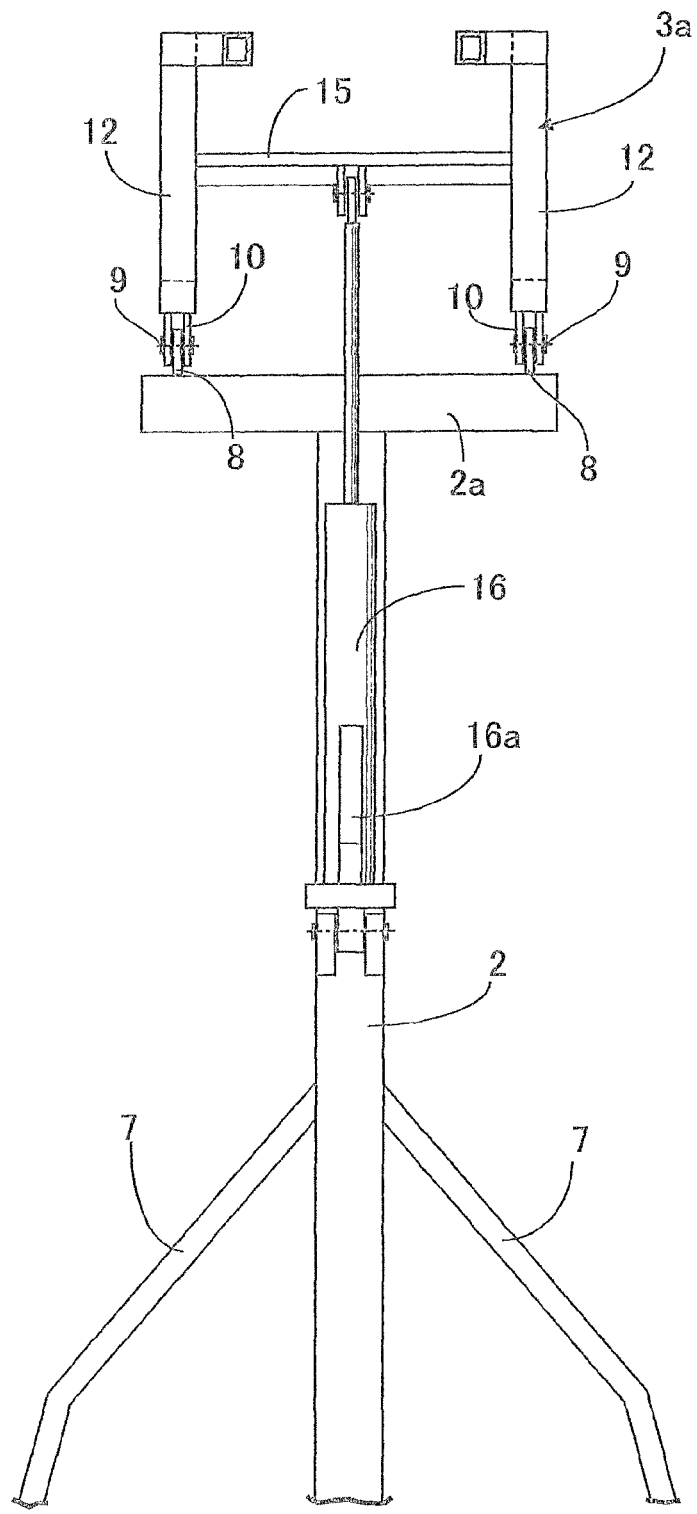
FIG. 5 is an enlarged sectional view along line 500-500 in FIG. 1.

In FIG. 4, the support post 2 has a horizontal arm portion 2a provided at the upper end, the horizontal arm portion 2a extending in a lateral direction parallel to the path P, and a base part of the support arm 3 is connected, via a pivot shaft 9 (see also FIG. 1), to a pair of left and right brackets 8 projectingly provided on an upper face of the horizontal arm portion 2a.

The support arm 3 is formed from a first arm half 3a having on a base part a boss 10 that is rotatably supported on the pivot shaft 9, and a second arm half 3b foldably connected to a tip of the first arm half 3a via a joint pin 11. The first arm half 3a is formed from a pair of left and right arm members 12 and a cross member 15 that integrally connects the two arm members 12 to each other in the vicinity of the base parts thereof, and the boss 10 is formed integrally with the base parts. These arm members 12 are bent in a dog-leg shape on the base part side, the cross member 15 is disposed in front of the bent part, and a telescopic cylinder 16 is mounted between the cross member 15 and the support post 2. This telescopic cylinder 16 has a built-in pneumatic pump; the telescopic cylinder 16 is extended by reciprocatingly operating a pump operation lever 16a, and the telescopic cylinder 16 can be contracted by releasing the pressure from the telescopic cylinder 16.

Figure 6:
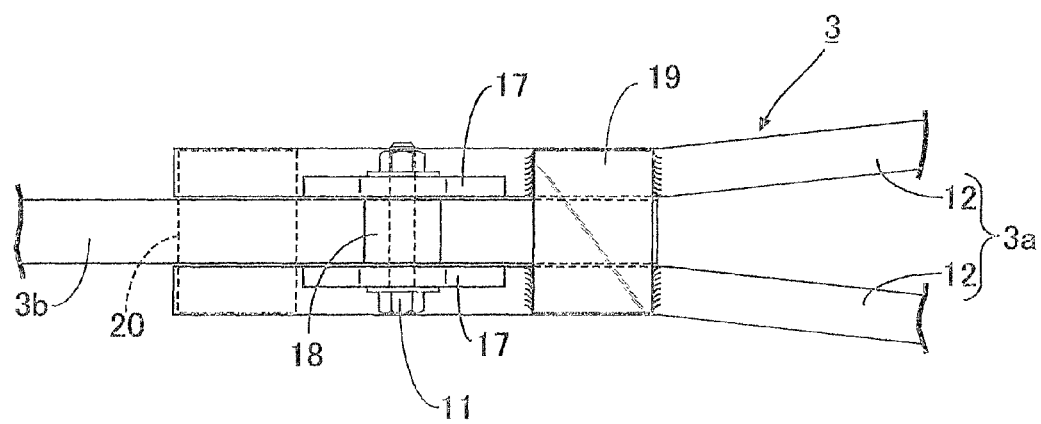
FIG. 6 is an enlarged view from arrow 600 in FIG. 1.

The distance between the two arm members 12 reduces in going toward the tips, and a bracket 17 is projectingly provided on top faces of these tips. On the other hand, a boss 18 disposed between the two brackets 17 is formed in the vicinity of the base part of the second arm half 3b, and this boss 18 is rotatably connected to the bracket 17 via the joint pin 11. In order to retain the first and second arm halves 3a and 3b in an extended state, as shown in FIG. 1 and FIG. 6, the pair of arm members 12 of the first arm half 3a have fixedly provided thereon a first stopper plate 19 supporting the top face of a tip of the second arm half 3b and a second stopper plate 20 supporting a bottom face of an intermediate section of the second arm half 3b.

Figure 2:
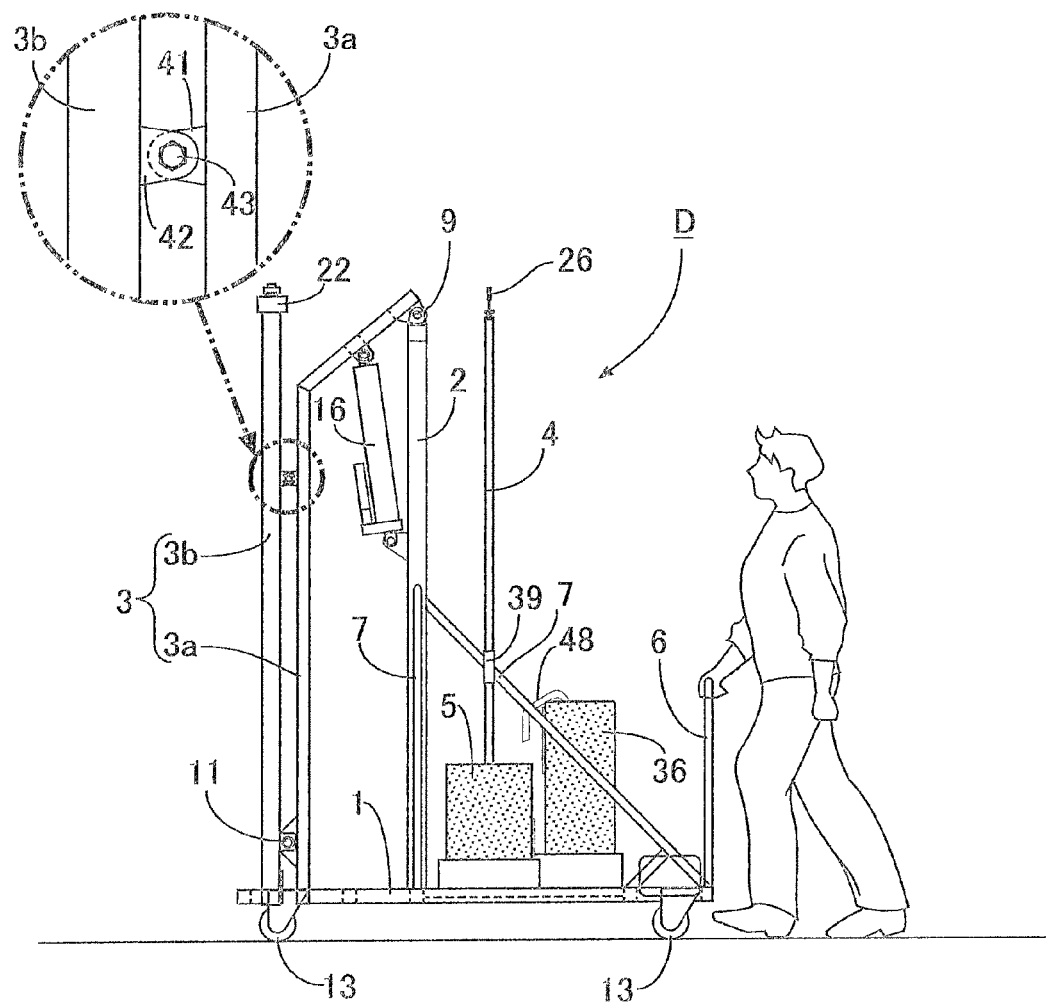
FIG. 2 is a side view of the device in a folded state.

Extending the telescopic cylinder 16 pivots the first arm half 3a to a horizontal direction as shown in FIG. 1, and in this process the second arm half 3b can be extended horizontally by pivoting it outward around the joint pin 11. Conversely, if the telescopic cylinder 16 is contracted, the first arm half 3a can be pivoted downward as shown in FIG. 2. In this process, the second arm half 3b pivots around the joint pin 11 so as to move away from the first and second stopper plates 19 and 20, is folded so as to be superimposed on the first arm half 3a, and is stored on the support platform 1. In order to retain this folded state, brackets 41 and 42 facing each other in that state are provided on the first and second arm halves 3a and 3b, and a connecting pin 43 is removably inserted thereinto (see FIG. 2).

Figure 7:
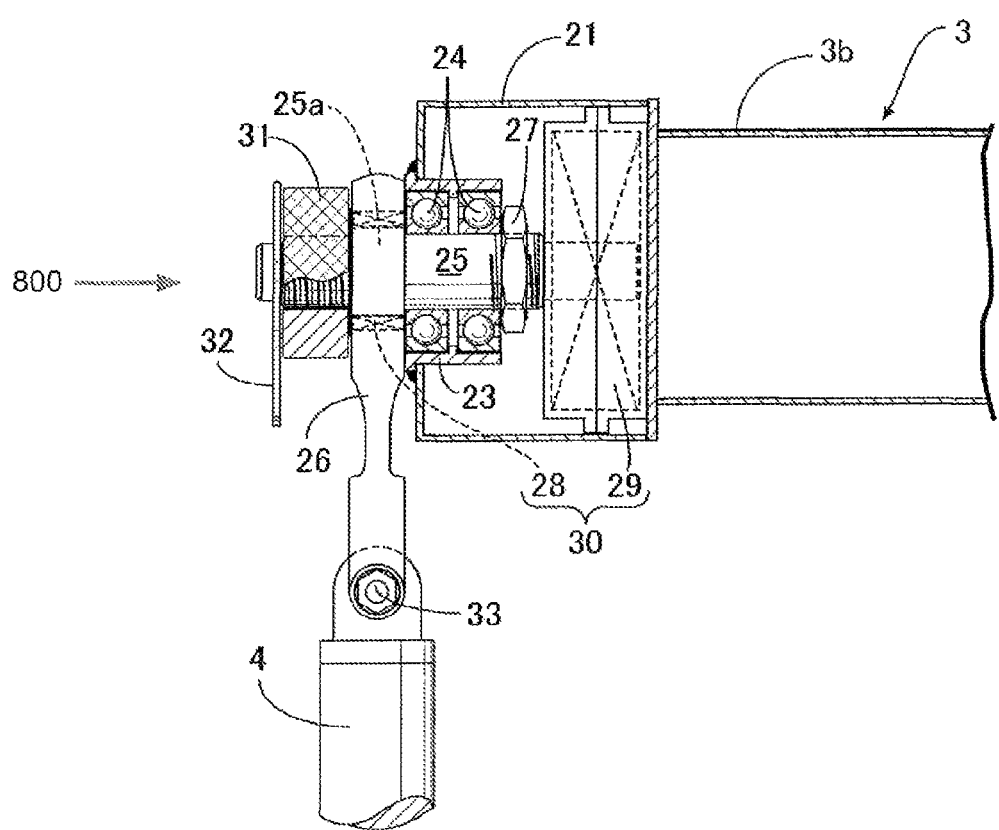
FIG. 7 is an enlarged vertical sectional view of part 700 in FIG. 1.
Figure 8:
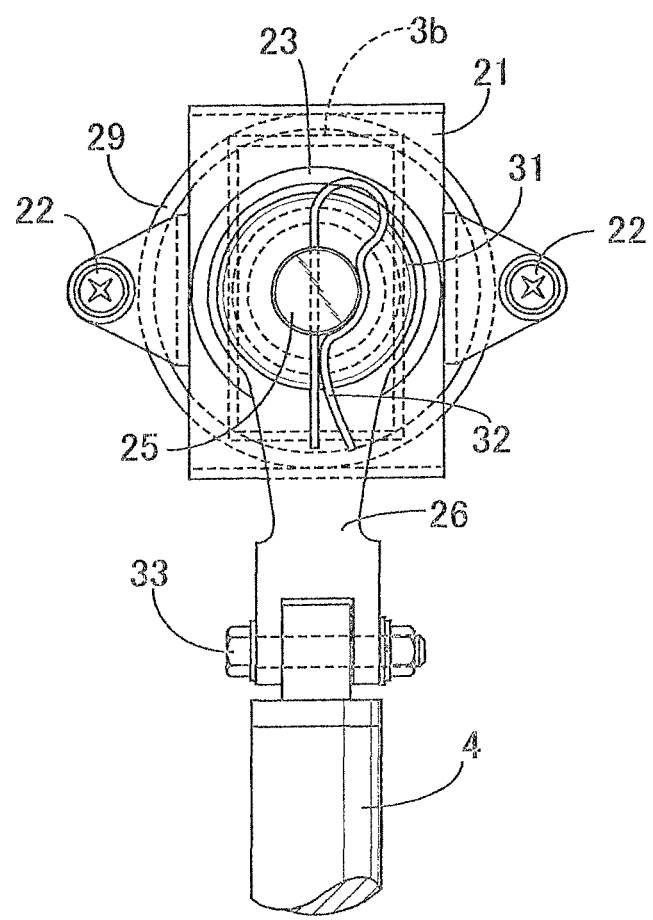
FIG. 8 is a view from arrow 800 in FIG. 7.

The connecting structure between the support arm 3 and the support rod 4 is now explained by reference to FIG. 7 and FIG. 8.

A control box 21 is secured by means of a bolt 22 to the tip of the support arm 3, that is, a tip face of the second arm half 3b. A bearing housing 23 disposed within the control box 21 is welded to an outer end wall of the box 21, and a support shaft 25 disposed in a horizontal direction that is perpendicular to the path P of the vehicle V is rotatably supported by multiple rows of ball bearings 24 mounted on the bearing housing 23. This support shaft 25 has opposite end parts projecting inside and outside the control box 21, and axial movement of the support shaft 25 relative to the ball bearing 24 is restrained by a large diameter shaft portion 25a projecting outside the control box 21 and a nut 27 screwed around the support shaft 25 within the control box 21.

A known rotary hydraulic damper 29 is provided in the interior of the control box 21, a casing of the hydraulic damper 29 is fixed to the control box 21, the support shaft 25 is connected to a rotor therewithin, and a fixed damping force is applied to rotation of the support shaft 25.

Furthermore, outside the control box 21, a swing lever 26 having its tip facing downward is detachably fitted onto the large diameter shaft portion 25a of the support shaft 25 via a one-way clutch 28.

Detachment of the swing lever 26 from the large diameter shaft portion 25a is restrained by a knurled nut 31 screwed around the support shaft 25, and this knurled nut 31 is prevented from becoming detached by means of a split pin 32 mounted at a tip of the support shaft 25. An upper end part of the support rod 4 is connected to a lower end part of the swing lever 26 via a pivot shaft 33 disposed in a direction perpendicular to the support shaft 25.

The one-way clutch 28 permits the support rod 4 to pivot forward toward the front of the path P of the vehicle V together with the swing lever 26 but inhibits rearward pivoting thereof, and a known type such as a ratchet type, a sprag type, or a roller type is used. Furthermore, by removing the split pin 32 and the knurled nut 31, the swing lever 26 can be separated from the support shaft 25 together with the one-way clutch 28.

The obstacle 5 and the structure for mounting it on the support rod 4 are now explained by reference to FIG. 4, and FIG. 9 to FIG. 11.

Figure 9:
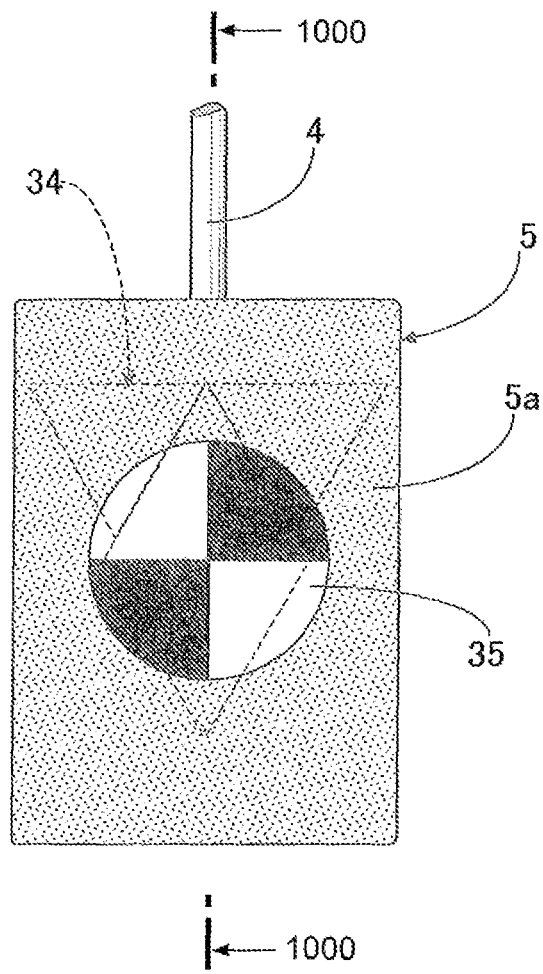
FIG. 9 is a front view of an obstacle (an enlarged view from arrow 900 in FIG. 4).
Figure 10:
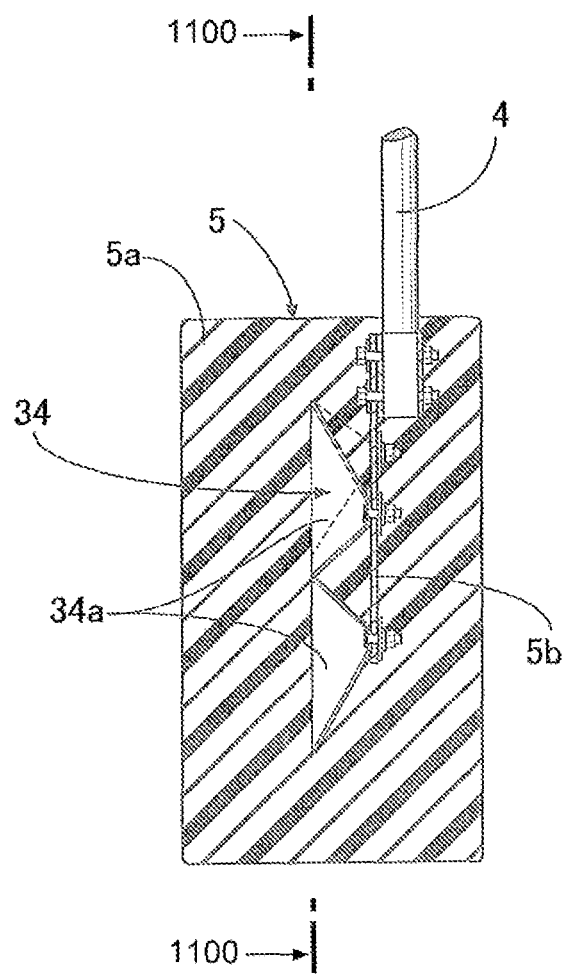
FIG. 10 is a sectional view along line 1000-1000 in FIG. 9.
Figure 11:
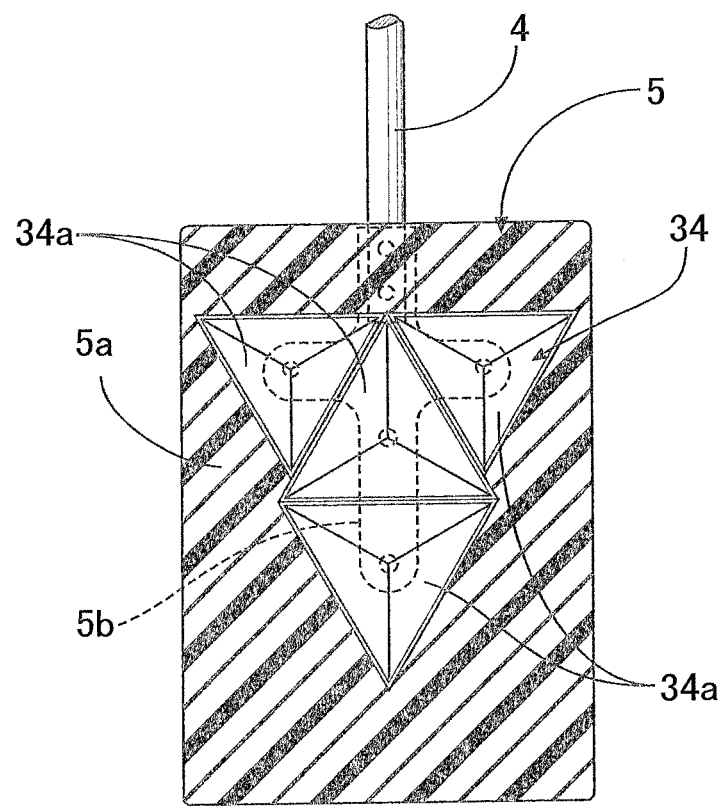
FIG. 11 is a sectional view along line 1100-1100 in FIG. 10.

As shown in FIG. 9 and FIG. 10, the obstacle 5 is formed from an obstacle main body 5a made of an impact absorbing material such as foamed urethane in a rectangular shape that is long in the vertical direction when viewed from the front from the vehicle V side, a cross-shaped elastic mounting plate 5b made of a plate spring embedded in the obstacle main body 5a, and radio wave reflection means 34 mounted on the elastic mounting plate 5b and embedded in the obstacle main body 5a together with the elastic mounting plate 5b, a lower end part of the support rod 4 being joined by a bolt to an upper end part of the elastic mounting plate 5b. The bolt-joined part is also embedded in the obstacle main body 5a. The radio wave reflection means 34 is formed from a plurality of reflectors 34a having a triangular pyramid-shaped concave reflecting face in the illustrated example, and one of the reflectors 34a is secured to each of a total of four positions, that is, a middle part, left and right opposite end parts, and a lower end part of the elastic mounting plate 5b in the illustrated example. The obstacle 5 is disposed within the path P so as to face the radar 45 attached to the front face of the vehicle V.

A target mark 35 is displayed on a central part of the front face of the obstacle main body 5a facing the vehicle V on the path P, the target mark 35 as shown in FIG. 9 having dimensions that can be recognized by the driver of the vehicle V that is waiting at a distance and having a color that stands out from the surroundings.

As shown in FIG. 4, a stable block 36, which can be placed on a road surface, is connected to a back face of the obstacle 5 via a hook-and-loop fastener 37. Furthermore, a length-adjustable connecting cord 38 is provided at the upper end of the stable block 36 in order to connect this to the support rod 4.

Referring again to FIG. 2, some of the plurality of stays 7 reinforcing the support post 2 are provided with a belt 39 for lashing the support rod 4 in a raised state to the stay 7 when the support rod 4 is detached from the support arm 3 and placed on the support platform 1 together with the obstacle 5.

As hereinbefore described, the one-way clutch 28 and the hydraulic damper 29 form swing control means 30 that makes resistance to a return swing of the support rod 4 from the forward swing position to the rear larger than resistance to swinging of the support rod 4 to the front due to collision of the vehicle V with the obstacle 5.

The operation of this embodiment is now explained.

When the driver is to experience the functions of the obstacle handling system mounted on the vehicle V, the support platform 1 is first fixed beside the path P of the vehicle V, the connecting pin 43 is detached, the telescopic cylinder 16 is then extended, and pivoting the first arm half 3a upward so as to be horizontal allows the second arm half 3b to be pivoted outward around the joint pin 11. In the course of this process, the swing lever 26 connected to the support rod 4 is mounted on the support shaft 25 by means of the knurled nut 31 and the split pin 32 as described above. After this mounting, further extending the telescopic cylinder 16 and making the first arm half 3a horizontal allows the second arm half 3b to be supported by the first and second stopper plates 19 and 20 and become horizontal as well. In this way, when the support arm 3 formed from the first and second arm halves 3a and 3b attains a horizontal state, the support rod 4 connected to the tip thereof attains a hanging-down state. In this process, if an operator applies a load to the support rod 4 in the vertical direction, the support rod 4 can easily be put in a vertical state by the action of the one-way clutch 28 and the hydraulic damper 29 disposed between the support arm 3 and the support rod 4. Furthermore, finely adjusting the height position of the tip of the support arm 3 by operation of the telescopic cylinder 16 enables the target mark 35 of the obstacle 5 connected to the lower end part of the support rod 4 to be disposed at a position exactly opposite to the radar 45 of the vehicle V on the path P.

Subsequently, the stable block 36 placed in frictional contact with road surface is connected to the back face of the obstacle 5 via the hook-and-loop fastener 37, and the connecting cord 38 extending from the stable block 36 is tied to the support rod 4. This stable block 36 can stabilize the obstacle 5 at a fixed position by frictional resistance against the road surface and prevent the obstacle 5 and the support rod 4 from swaying due to wind.

In this case, it is preferable to give an appropriate degree of slack to the connecting cord 38 so that the position of connection of the stable block 36 to the obstacle 5 by the hook-and-loop fastener 37 can be adjusted. Adjustment of the position of connection of the stable block 36 to the obstacle 5 by the hook-and-loop fastener 37 is carried out in response to adjustment of the height of the obstacle 5 according to the height of the radar 45 of the vehicle V, and this adjustment enables the stable block 36 to be always put in frictional contact with road surface.

When the driver makes the vehicle V travel toward the obstacle 5 from a position sufficiently distant from the obstacle 5 while the obstacle 5 is set at a predetermined position as described above, the obstacle handling system of the vehicle V computes a relative speed and a distance of the vehicle V with respect to the obstacle 5 from the conditions of transmission and reception of radio waves between the radar 45 and the radio wave reflection means 34 and further computes a degree of obstruction, and when it is determined that the degree of obstruction exceeds a predetermined value, the driver is warned by applying a tensioning force to a seat belt of the vehicle V or automatically operating a brake. In this way, the driver can reliably experience the functions of the obstacle handling system mounted on the vehicle V by making the vehicle V approach the obstacle 5.

In this process, since the target mark 35 having dimensions that can be recognized by the driver of the vehicle V waiting at a distance and having a color that stands out from the surroundings is displayed on the front face of the obstacle 5, it becomes easy for the driver to see the obstacle 5 by means of the target mark 35, and it is possible to drive the vehicle accurately toward the obstacle 5 without being misled by the surrounding landscape.

Figure 12:
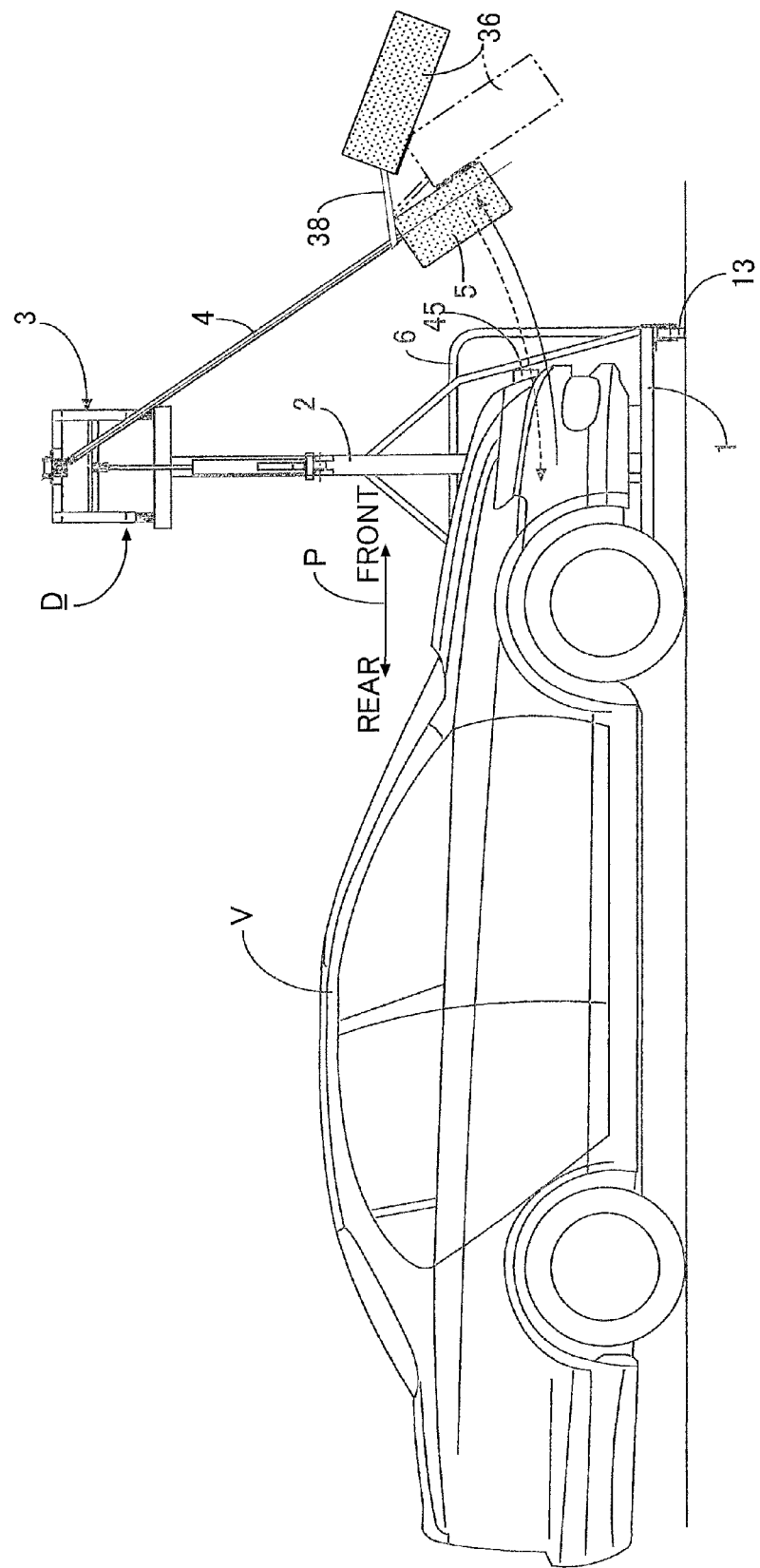
FIG. 12 is a diagram for explaining the operation of the obstacle device for vehicle driving experience.

When the obstacle handling system of the vehicle V operates, it is desirable for the driver to immediately carry out sudden braking to thus stop the vehicle V in front of the obstacle 5, but depending on the driver, the vehicle V might collide with the obstacle 5 as shown in FIG. 12. In this case, the obstacle 5 and the stable block 36 receive an impact force from the vehicle V, but since in this process the swing lever 26 connected to the support rod 4 is supported on the support shaft 25 of the support arm 3 via the one-way clutch 28, swinging thereof in the direction of travel of the vehicle V is permitted, and since the obstacle main body 5a of the obstacle 5 is made of a collision absorbing material, collision energy of the vehicle V is absorbed by the obstacle 5 smoothly swinging forward. It is therefore possible to suppress any damage not only to the vehicle V but also to the obstacle 5 and to greatly calm down any fear given to the driver of the vehicle V.

The obstacle 5 hanging down from the support arm 3 can also be formed in a relatively small size that is sufficient for including the radio wave reflection means 34, and the fear given to the driver is less if it is small; it is therefore also possible to practice emergency braking by making the vehicle V come as close to the obstacle 5 as possible.

On the other hand, even if the stable block 36 mounted on the obstacle 5 is separated from the obstacle 5 as a result of detachment of the hook-and-loop fastener 37 by an impact force due to the frictional resistance against the road surface and the impact force from the vehicle V, it swings together with the obstacle 5 due to the presence of the connecting cord 38 between the support rod 4 and the stable block 36, and it is thus possible to prevent the stable block 36 from being separated and thrown a long way off.

Furthermore, since the support rod 4 and the swing lever 26 are connected to each other via the pivot shaft 33, which is perpendicular to the support shaft 25, even if the vehicle V collides obliquely with the obstacle 5 and an impact component force in the lateral direction acts on the obstacle 5, the support rod 4 also swings around the pivot shaft 33 in the lateral direction without any resistance to thus allow the above impact component force to escape, and it is possible to suppress the imposition of a bending load on the support rod 4 in the lateral direction.

Moreover, since the obstacle 5 is connected to the support rod 4 via the elastic mounting plate 5b embedded in the obstacle main body 5a, and the radio wave reflection means 34 is mounted on the elastic mounting plate 5b, the impact that the obstacle 5 receives from the vehicle V is absorbed by the obstacle main body 5a made of an impact absorbing material and also by flexure of the elastic mounting plate 5b, and it is possible to alleviate effectively the impact applied to the vehicle V, the support rod 4, and the radio wave reflection means 34.

Furthermore, since the support rod 4 hangs from the support arm 3 disposed outside and above the path P of the vehicle V, the support rod 4 and the obstacle 5 swing within the path P, and do not interfere with operations of the operator supervising outside the path P.

After the above-mentioned collision, when the obstacle 5 that has swung greatly forward of the vehicle V loses momentum and attempts to swing to the backward side, the one-way clutch 28 attains a locked state and prevents the support rod 4 from swinging back. However, since the hydraulic damper 29 for attenuating swinging of the support arm 3 is disposed between the support shaft 25 and the support arm 3, regardless of the one-way clutch 28 being in a locked state, the hydraulic damper 29 permits the support rod 4 to swing back gently. Therefore, even if the vehicle V stops on the backward swing trajectory of the obstacle 5, since the obstacle 5 comes into contact with the vehicle V with a soft touch, it is possible to suppress any adverse effect on the vehicle V and the obstacle 5. Moreover, when the damping force of the hydraulic damper 29 is large and the support rod 4 stops at a forward swing position, after the vehicle V is moved from the collision position, the support rod 4 can be easily returned to the original vertical position by the operator applying thereto a swinging force in the direction that puts it back.

In this way, the support rod 4 goes back to a vertical state, and the stable block 36 that is in frictional contact with road surface is connected again to the obstacle 5 via the hook-and-loop fastener 37, thus simply and quickly carrying out preparation for the next experience of driving.

After the obstacle device D for vehicle driving experience is used, as shown in FIG. 2, the support arm 3 is folded and stored on the support platform 1, the support arm 3 is removed from the support rod 4, the support rod 4 is placed on the support platform 1 together with the obstacle 5, and the support rod 4 is lashed to the stay 7 by the belt 39; furthermore, the connecting cord 38 is untied, the hook-and-loop fastener 37 is detached, and the stable block 36 is also placed on the support platform 1, thus enabling the obstacle device D for vehicle driving experience to be put together compactly on the support platform 1 and thereby enabling moving and storage of the device D to be carried out easily.

Figure 13:
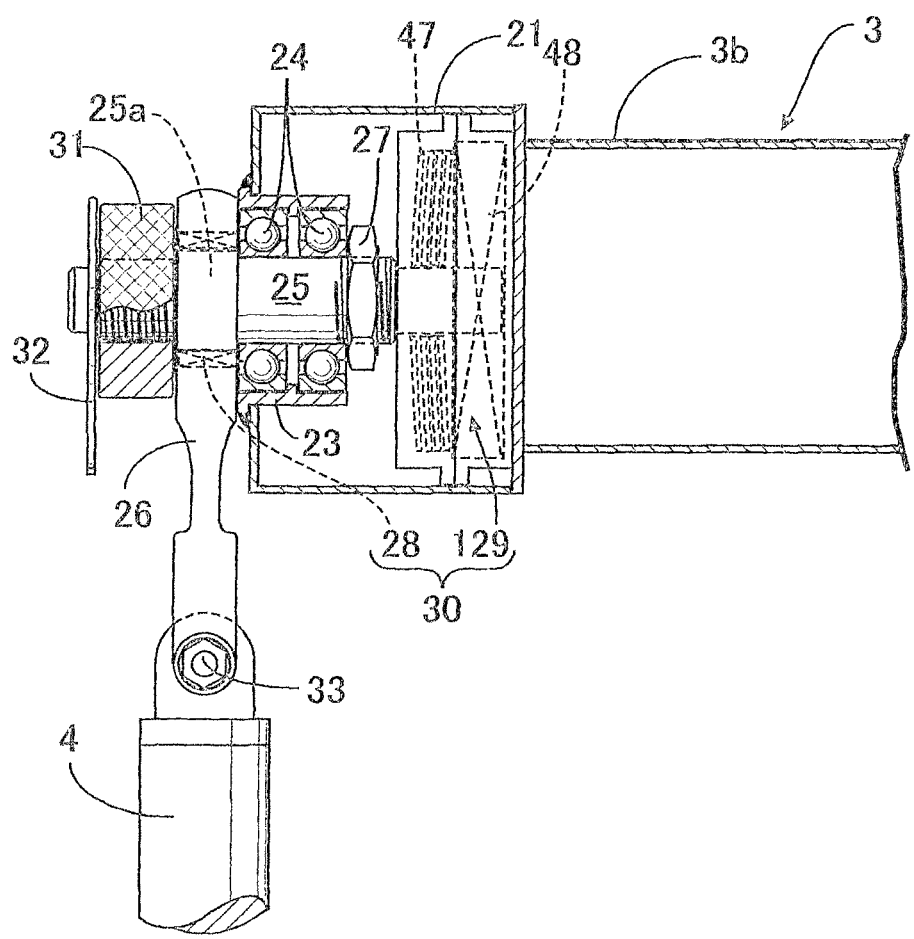
FIG. 13 is a view, corresponding to FIG. 7, of another embodiment of the present invention.

Another embodiment of the present invention shown in FIG. 13 is now explained. This embodiment has the same arrangement as that of the preceding embodiment except that a known friction damper 129 formed by combining a dish spring 47 and a multiple plate friction plate 48 is housed in a control box 21 instead of the rotary hydraulic damper 29; portions in FIG. 13 corresponding to those in the preceding embodiment are denoted by the same reference numerals and symbols, and duplication of the explanation is omitted.

Since the above-mentioned friction damper 129 also applies a damping force to rotation of a support shaft 25 in the same manner as the hydraulic damper 29, after a vehicle V has collided with an obstacle 5, the swinging back of a support rod 4 can be controlled so that it is gentle. The above-mentioned friction damper 129 therefore forms, in cooperation with a one-way clutch 28, swing control means 30 that makes resistance to the return swing of the support rod 4 from the forward swing position to the rear larger than resistance to swinging of the support rod 4 to the front due to collision of the vehicle V with the obstacle 5.

The present invention is not limited to the above-mentioned embodiments, and may be modified in a variety of ways as long as the modifications do not depart from the spirit and scope thereof. For example, the support rod 4 having the obstacle 5 provided on the tip may be disposed horizontally or obliquely. Furthermore, the obstacle device for vehicle driving experience of the present invention may be used in applications other than those of the above-mentioned embodiments. For example, it may also be used when a driver of a vehicle traveling toward the obstacle 5 experiences sudden braking driving by carrying out sudden braking from a predetermined position and stopping the vehicle in front of the obstacle 5. In this case, it is not necessary to provide the obstacle 5 with the radio wave reflection means 34.

The invention claimed is:

1. An obstacle device for vehicle driving experience comprising a support part that is disposed outside a path of a vehicle, a support rod that is supported on the support part and is capable of swinging back and forth along the path, and an obstacle that is attached to a tip of the support rod and positioned within the path of the vehicle, wherein a swing control device is provided between the support part and the support rod, the swing control device making resistance to a return swing of the support rod from a forward swing position to a rear larger than resistance to swinging of the support rod to a front due to collision of the vehicle with the obstacle.

2. The obstacle device for vehicle driving experience according to claim 1,
wherein the support part is disposed above the path of the vehicle, the support rod is hung from the support part via the swing control device, and the obstacle is attached to a lower end part of the support rod.

3. The obstacle device for vehicle driving experience according to claim 1,
wherein the swing control device is formed by disposing in series a one-way clutch and a damper between the support part and the support rod, the one-way clutch allowing the forward swing of the support rod but restraining the rearward swing, and the damper generating a damping force for at least the rearward swing of the support rod.

4. The obstacle device for vehicle driving experience according to claim 2,
wherein a support post is standingly provided on a support platform placed outside the path of the vehicle, a support arm as the support part is connected to an upper end part of the support post, the support arm extending above the path of the vehicle, the support rod is detachably mounted on the tip of the support arm, and the support arm is arranged so that a state thereof can be changed between an extended state in which the support rod can be hung therefrom and a contracted state in which the support rod is stored on the support platform.

5. The obstacle device for vehicle driving experience according to claim 2,
wherein the obstacle is formed from a mounting plate connected to the lower end of the support rod and an obstacle main body, made of an impact absorbing material, mounted on the mounting plate so as to cover the mounting plate, a radio wave reflection device is mounted on the mounting plate the radio wave reflection device being covered by the obstacle main body, and the radio wave reflection device is disposed so as to reflect radio waves, transmitted by a radar of an obstacle handling system provided on the vehicle, toward the radar side.

6. The obstacle device for vehicle driving experience according to claim 5,
wherein the support rod is connected to the support part so that the support rod can swing in a direction perpendicular to the path of the vehicle.

7. The obstacle device for vehicle driving experience according to claim 5,
wherein a stable block is provided so as to be connected to the obstacle, the stable block being disposed so as to have friction against the road surface.

8. The obstacle device for vehicle driving experience according to claim 7,
wherein the stable block is formed so as to be separable from the obstacle, and the obstacle and the stable block are connected via a connecting cord.

9. The obstacle device for vehicle driving experience according to claim 5,
wherein a target mark is displayed on a front face of the obstacle facing the vehicle on the path, the target mark having dimensions that can be recognized by a driver of the vehicle that is waiting at a distance and having a color that stands out from the surroundings.

10. The obstacle device for vehicle driving experience according to claim 5,
wherein a support post is standingly provided on a support platform placed outside the path of the vehicle, a support arm as the support part is connected to an upper end part of the support post, the support arm extending above the path of the vehicle, the support rod is detachably mounted on the tip of the support arm, and the support arm is arranged so that a state thereof can be changed between an extended state in which the support rod can be hung therefrom and a contracted state in which the support rod is stored on the support platform.

* * * * *